United States Patent [19]

Chlanda et al.

[11] 4,116,889
[45] Sep. 26, 1978

[54] BIPOLAR MEMBRANES AND METHOD OF MAKING SAME

[75] Inventors: Frederick P. Chlanda, Rockaway; Lester T. C. Lee, Parsippany; Kang-Jen Liu, Somerville, all of N.J.

[73] Assignee: Allied Chemical Corporation, Morris Township, Morris County, N.J.

[21] Appl. No.: 715,765

[22] Filed: Aug. 19, 1976

[51] Int. Cl.$^2$ .............................. C08J 5/22; C08J 5/24; C25D 21/22

[52] U.S. Cl. ................................ 521/27; 204/180 P; 264/308; 427/385 B; 427/2; 210/490; 210/500 M; 428/421; 428/520; 428/522

[58] Field of Search ........................ 260/2.1 R, 2.1 M; 204/180 P; 264/308; 427/385 B, 2; 428/520, 522, 421

[56] References Cited

U.S. PATENT DOCUMENTS

| | | | |
|---|---|---|---|
| 2,374,308 | 4/1945 | Rooney et al. .................... | 264/308 |
| 2,681,319 | 6/1954 | Bodamer ......................... | 204/180 P |
| 2,681,320 | 6/1954 | Bodamer ......................... | 204/180 P |
| 2,829,095 | 4/1958 | Oda et al. ........................ | 204/180 P |
| 3,510,417 | 5/1970 | Mizutani et al. ................. | 204/180 P |
| 3,562,139 | 2/1971 | Leitz .............................. | 204/180 P |
| 3,705,846 | 12/1972 | Kato et al. ...................... | 204/180 P |
| 3,808,305 | 4/1974 | Gregor ............................ | 264/331 |
| 3,840,482 | 10/1974 | Bolto et al. ..................... | 260/2.1 R |
| 3,984,358 | 10/1976 | Nefedora et al. ............... | 260/2.1 M |
| 4,012,324 | 3/1977 | Gregor ............................ | 210/500 M |

FOREIGN PATENT DOCUMENTS

1,038,777   8/1966   United Kingdom ................. 260/2.1 R

OTHER PUBLICATIONS

Frilette, V. J., *Jour. of Phys. Chem.*, vol. 60, 1956, pp. 435-439.

*Primary Examiner*—Joseph L. Schofer
*Assistant Examiner*—Maria S. Tungol
*Attorney, Agent, or Firm*—Arthur J. Plantamura; Ernest A. Polin; Thomas D. Hoffman

[57] ABSTRACT

Stable bipolar membranes of high permselectivity and low potential drop are prepared using either an anion or cation preformed first layer upon which a second layer or coating of an ion exchange resin of the opposite charge carried in a matrix polymer is applied. The second layer may be suitably applied such as by casting as a slurry of the ion exchange resin in a solution or by laminating a layer comprising a dispersion of the resin in a solid or fused polymer. Optionally, the surface of the first layer may be treated to increase the resin concentration and/or bonding at the interface, such as by sanding, etching, etc.

17 Claims, 2 Drawing Figures

BIPOLAR MEMBRANES AND METHOD OF MAKING SAME

BACKGROUND OF THE INVENTION

Bipolar membranes have been prepared to study their ability of rectify alternating current, for improving desalination processes, as analogs to certain biological membranes, and for the production of acid and base from salt. The latter process has great potential usefulness since it allows the production of commercially important acids and bases from neutral salts e.g. NaCl may be converted to HCl and NaOH. The potential for carrying out this type of conversion by means of bipolar membranes, the process known as electrodialytic water splitting, has not yet been realized as an industrial process primarily due to shortcomings in bipolar membranes which should have the following properties:

(1) sufficient mechanical strength
(2) ability to operate at high current density
(3) high permselectivity
(4) low potential drop
(5) stable properties Additionally the bipolar membrane should be easily fabricated and have reproducible properties. Many preparations of bipolar membranes are reported in the literature. For example in U.S. Pat. No. 2,829,095, bipolar membranes are disclosed as being prepared by adhering two membranes consisting of oppositely charged ion exchange resins in an inert matrix bonded together either by fusion with heat and pressure or by use of a polyethyleneimine-epichlorohydrin paste. Anion and cation membranes have also been fused together as disclosed in U.S. Pat. No. 3,372,101 and British Pat. No. 1,038,777 by means of heat and pressure to give bipolar membranes. Additionally the application of an anionic polyelectrolyte paste to a cationic membrane which is then cured to yield a bipolar membrane has been described. Further, the preparation of bipolar membranes from a single sheet of material by selective functionalization of one side to cation or anion membrane followed by functionalization of the other side to the opposite type of membrane is disclosed for example in U.S. Pat. No. 3,654,125, and the formation of bipolar membranes in situ by passing a direct current through anion or cation membranes in contact with finely divided ion exchange resin slurries of charge opposite to that of the membrane is disclosed in published U.S. patent application Ser. No. 435,791, filed Jan. 23, 1974 (PB 230409) National Technical Information Service (Chemical Abstract, Vol. 81, 176899$m$). In spite of such prior disclosures most membranes available up to the present time have been deficient in one or more of the properties desirable for bipolar membranes to be used for the process of electrodialytic water splitting on a practical level. It is thus seen that a need exists for a bipolar membrane of improved stability, high permselectivity and low potential drop.

SUMMARY OF THE INVENTION

Advantageous bipolar membranes may be obtained in accordance with the invention by using a polymer matrix to bond ion exchange resin particles to the oppositely charged membrane. Since the binding force is provided by the matrix, the electrostatic interaction of the resin particles in one layer with the other layer can be nil, or insignificant and still have the particles remain in contact with the other layer. In addition, the spaces between the resin particles are filled by the impermeable matrix so that relatively much higher permselectivity may be attained than if no matrix is used. Since the electrostatic interaction is not required for the binding of resin particles to the other layer, when a matrix is used, highly crosslinked resins may be used thereby reducing interpenetration of one layer into the other to a minimum which should consequently reduce the potential drop.

The bipolar membranes are prepared in accordance with the present invention with either the anion or cation membrane serving as the first or preformed layer with the matrix polymer and ion exchange resin being coated on one side to form the bipolar membrane. Where the first layer is the anion membrane, then the resin used in the coating is of the cation exchange type and vice versa. The first layer may be a commercially available membrane or may be prepared by the techniques known in the art or by the methods enumerated hereinafter in the present disclosure. The requirements of the system of the invention are that the matrix for the ion exchange resin layer adhere strongly to the first layer to give a strong, permanent bond and that the ion exchange groups of the first layer be connected in a continuous lattice (i.e. that the polyelectrolyte be crosslinked). Where the membrane is of the particle in matrix type (i.e. heterogeneous) a mixing of anion and cation particles may occur which can cause the potential drop to be higher than is desirable unless the particles in the first layer are fixed in place. The second layer may be applied to the first either as a slurry of the resin in a solution of the matrix polymer in some solvent by solution casting or as a dispersion of the resin in the solid or fused polymer by lamination.

It may also be advantageous to modify the surface of the first layer before coating e.g. to increase the resin concentration at the interface or to increase the bonding between the two layers. After the membrane is formed of two layers, one or more additional layers to improve the permselectivity or other properties of the membrane may also be applied.

A particularly advantageous method for forming bipolar membranes by the method of this invention is to form the anion layer first from a mixture of polyvinylidene fluoride, polyvinylbenzyl chloride, solvent, and multifunctional amine at least one of the functional groups of which is tertiary mixed together in the proper proportions. Generally, anion membranes useful in bipolar membranes or for other electrodialysis purposes result when the weight ratio of polyvinylidene fluoride to polyvinylbenzyl chloride is between 0.3 and 0.7 and the molar ratio of amine to benzyl chloride groups is between 0.5 and 4.0. N,N-dimethylformamide is a particularly useful solvent in this system. This mixture remains mobile at room temperature long enough so that it may be spread to a uniform thickness, but it gels on standing for several minutes at room temperature. After the solvent is removed by evaporation at elevated temperature, a membrane of low resistance and high permselectivity, in which the polyelectrolyte contains quaternary ammonium groups and is crosslinked, results.

DETAILED DESCRIPTION OF THE INVENTION

Figure 1:
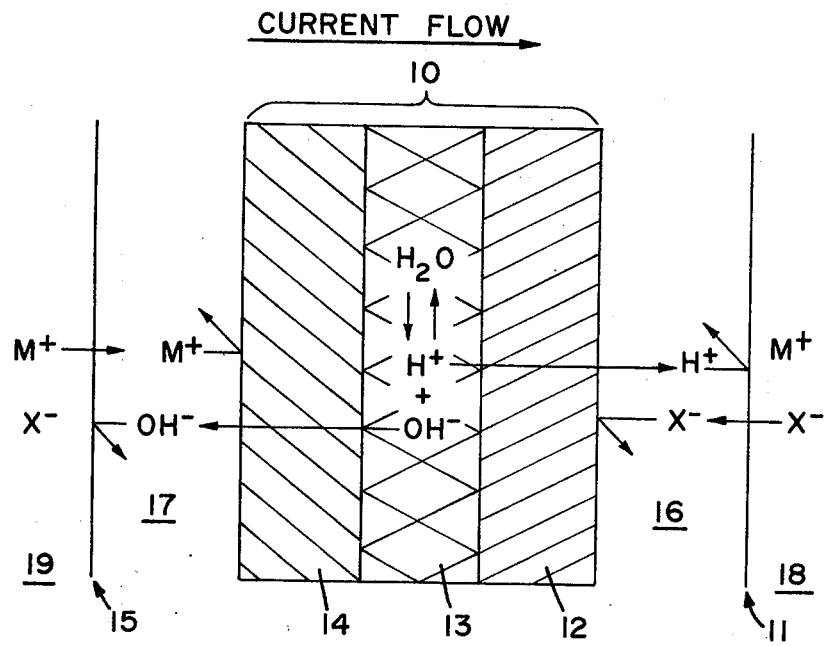
FIG. 1 illustrates schematically and in a magnified scale an arrangement by which a bipolar membrane prepared in accordance with the invention may be used to generate acid and base.

The fundamental concept by which a bipolar membrane may be used to produce acid and base may be understood by reference to FIG. 1 in which a greatly magnified portion of a bipolar membrane 10, not drawn to scale is shown schematically. The bipolar membrane 10 consists of three portions, a cation selective portion, 12, an anion selective portion, 14, and the interface region 13, between the anion and cation portions. When a direct current is passed across the bipolar membrane as shown, the transport of ions between solutions 16 and 17 is interrupted since cations, $M^+$, may not penetrate the anion side, 14, and anions, $X^-$, may not penetrate the cation side 12. Since little or no salt is present in the interface region 3, the dissociation of water to $H^+$ and $OH^-$ provides the ions for carrying the current across the membranes. Water at the interface is replaced by diffusion through the anion, 14, and cation, 12, portions from the solutions 17 and 16. When used in conjunction with monopolar membranes, one arrangement of which is shown in FIG. 1, the bipolar membrane is capable of generating acid and base from salt MX. If 11 is an anion permeable membrane then as $H^+$ enters solution 16 from the bipolar membrane, 10, an equivalent amount of $X^-$ will enter 16 from 18 producing a solution of HX in 16. Similarly, if 15 is a cation membrane then as $OH^-$ enters 17 from the bipolar membrane 10, $M^+$ will enter 17 from 19 to form a solution of MOH. This type of process to produce acid and base has been described in more detail in the aforementioned U.S. Pat. No. 2,829,095.

While the principle by which bipolar membranes produce $H^+$ and $OH^-$ is known, the fabrication of membranes to carry out this process efficiently has proved in the past to be difficult. The electrical potential required to generate acid and base by means of a bipolar membrane as given by electrochemical theory should be on the order of 0.8 volts to produce 1 N solutions of strong acid and base. Some additional potential is also required to overcome the resistance to transport of $H^+$ and $OH^-$ through the cation and anion portions of the membrane respectively. For reasons not entirely understood, the theoretical potential required is often greatly exceeded, especially at high current densities. However, the following explanation for this behavior which leads to general requirements for constructing bipolar membranes for generating acid and base at close to the theoretical potential drop is postulated. If a bipolar membrane is constructed in such a way that there is a poorly conducting layer between the anion and cation portions, high potential drop will result. Such a layer can arise when the anion and cation layers are separated by a layer of water (a poor conductor) or by a layer in which the two types of charged polymers used in the layers interpenetrate in such a fashion that the charges on each associate with one another leaving few mobile ions to conduct the current. Furthermore, high potential drops might result when the anion and cation material are juxtaposed in such a fashion that $H^+$ already in the cation portion may travel to the anion portion to react with $OH^-$ and vice versa, thus reforming water molecules.

The novel bipolar membrane exhibiting low potential drop, high current efficiency and stable properties capable of operating at high current density in a simple and efficient manner and the methods for preparing the same in accordance with the invention is accomplished in essence by coating onto a preformed anion or cation membrane or layer, a second layer consisting of a matrix and a small particle ion exchange resin.

A requirement for producing bipolar membranes of low potential drop is that the anion and cation layers be brought into intimate contact (to prevent formation of a high resistance water layer) but that they do not substantially interpenetrate or mix with one another in a manner which would result in a high resistance layer at the interface between the two layers. For example in the past, the practice of using low molecular weight polyelectrolyte precursors or linear or low crosslinked polyelectrolyte as a coating on a preformed anion or cation membrane to form a bipolar membrane results in the diffusion of the mobile components into the preformed matrix resulting finally in an intermingling of the anion and cation portions which can cause a high potential drop when the membrane is used for electrodialytic water splitting. On the other hand, fusing two sheets of membrane together can result in a gap at the interface between the two components, a layer of nonconductive polymer, or a mixing of charges by mechanical action which can also result in a high potential drop.

If a coating of crosslinked polyelectrolyte (ion exchange resin) is applied to the surface of a membrane to form a bipolar membrane interpenetration of the oppositely charged layers can be reduced; such disclosure is found in the aforementioned patent application Ser. No. 435,791 which, however, does not report how low the potential drops are. Also, the method chosen therein for coating the membrane has serious defects. First, there is nothing therein disclosed teaching how the particles can be made to adhere to the membrane except by means of electrostatic forces and if the particles are to adhere to the surface there must be significant interpenetration of one charged species into another similar to the well known phenomenon of fouling of ion exchange membranes by charged macromolecules (e.g. humic acids). The result as the examples therein indicate, do not produce membranes with high permselectivity.

In forming bipolar membranes by the method of this invention a preferred sequence resides in forming the anion layer first from a mixture of polyvinylidene fluoride, polyvinylbenzyl chloride, solvent, and multifunctional amine at least one of the functional groups of which is tertiary mixed together in the proper proportions. Anion membranes useful in bipolar membranes or for other electrodialysis purposes are obtained when the weight ratio of polyvinylidene fluoride to polyvinylbenzyl chloride is preferably between 0.3 and 0.7 and the molar ratio of amine to benzyl chloride groups is between 0.5 and 4.0. Any suitable solvent may be employed, with N,N-dimethylformamide being a particularly useful solvent in this system.

The mixture is proportioned so that it remains mobile at room temperature for a sufficient period so that it may be spread to a uniform thickness; thereafter, it gels on standing for several minutes at room temperature. After the solvent is removed by evaporation at elevated temperature, a crosslinked layer, i.e. membrane, of low resistance and high permselectivity results in which the polyelectrolyte contains quaternary ammonium groups. Similar anion layers may be formed using other matrix polymers e.g. polyvinyl chloride, polysulfone or polyether sulfone and the like.

The major reactions which occur as the membrane is formed are illustrated in the equation below. Crosslinking occurs when two or more benzyl chloride groups react with a single molecule of amine (Structure III). Quaternary ammonium groups are introduced by reaction of the tertiary amine groups with the benzyl chloride group (Structures II and III). Weakly basic groups are also introduced (I).

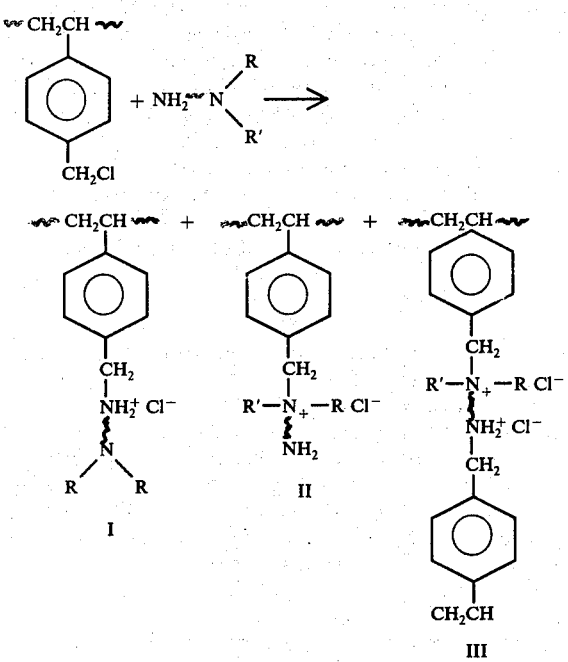

A wide variety of amines or mixtures of amines may be used including N,N-dimethylpropanediamine, N,N,N',N'-tetramethylpropanediamine, N,N,N',N'-tetramethylxylenediamine, N,N-dimethylbutanediamine, N,N,N',N'-tetramethylbutanediamine, N-methylpiperazine, and the like. Primary, secondary or tertiary amines such as hexamethylenediamine, propylamine, N-methylpropylamine, N,N'-dimethylpropylamine and the like may also be used in mixture with the first group of amines. When the membrane is to be used as one layer of a bipolar membrane, the amine used has an effect on the potential drop of the final bipolar membrane even if all subsequent steps are carried out in an identical manner.

The cation layer may be formed from a dispersion of a cation exchange resin in a solution of polyvinylidene fluoride by coating one side of the anion layer with the dispersion and evaporating the solvent. Particularly advantageous is the use of very small resin particles. Commercially available ion exchange resins have diameters greater than 1 micron. Much smaller particles of cation exchange resin may be prepared by sulfonation of particles of styrene-divinylbenzene copolymers prepared by emulsion polymerization. The preparation of such particles has been described in the literature, see for example, F. S. Chan and D. A. I. Goring, Canadian J. Chem., 44, 725 (1966) and V. S. Shashoua and R. G. Beaman, J. Polymer Sci., 33, 101 (1958), but their use for ion exchange membranes is not known. Anion resin particles of similar size may be prepared from chloromethylated styrene-divinylbenzene copolymer particles or vinylbenzyl chloride-divinyl benzene copolymer particles by reaction of the particles with amines.

When an anion membrane prepared by the general method hereinabove described is coated directly with the cation coating, the resulting membrane has a potential drop of 1.8 volts at 75 amp/ft$^2$. The advantage of modifying the anion layer before coating is seen when one compares this potential drop with that of another membrane prepared in the following manner. The anion layer is prepared in exactly the same way as for the above membrane. Before coating, however, the surface of the membrane is abraded with a fine grit sandpaper, then small particle cation exchange resin in a dry state is spread on the surface to form a very thin layer and the membrane is coated with the same cation coating as before. The potential drop across this membrane is reduced to 1.4 volts at 100 amp/ft$^2$ when the resin spread on the surface is the same as that used in the coating.

Furthermore, the dry resin spread on the surface of the anion membrane affects the potential drop even though the subsequent cation coating remains the same. The resin in the example cited above was highly crosslinked having been made with 36% commercial, i.e. 55% divinylbenzene and 64% styrene. Any crosslinking mechanism known to those skilled in the art as affording crosslinking equivalent to divinylbenzene may be used in lieu of divinylbenzene, e.g., radiation or other polyfunctional monomeric or polymerizable compound. When a low degree of crosslinking was present in the cation resin (10.6% commercial divinylbenzene) the resulting membrane had a potention drop of 2.0 volts at 100 amp/ft$^2$. When the crosslinking was 16.6% the potential drop was 1.60 volts at 100 amp/ft$^2$. Using a highly crosslinked resin prepared by sulfonation of particles of vinylbenzyl chloride-divinylbenzene of 20% by weight commercial divinylbenzene the voltage drop was 1.3 volts at 100 amp/ft$^2$. This material is very highly crosslinked because additional crosslinking occurs during the sulfonation reaction. Inorganic ion exchange materials such as zirconium phosphate may also be used and when zirconium phosphate exchanger prepared by the method disclosed by A. Clearfield and J. A. Stynes, J. Inorg Nuc. Chem., 26, 117 (1963) was used the resulting membrane had a potential drop of about 1 volt at 100 amp/ft$^2$.

All of the organic resins referred to above were of very small particle size, about 500Å, although as dry resins they are agglomerates of larger size. When a commercial resin MFC-10 of Ionac, Inc. of particle size <35 micron was used on the surface of the anion layer the resulting membrane had a potential drop of 1.7 volts at 75 amp/ft$^2$. Similarly when 50–100 mesh resin Dowex 50W×8 was ground to a fine powder and spread on the anion layer a high potential drop resulted, 1.7 volts at 100 amp/ft$^2$.

Another system which may be used to prepare low potential drop bipolar membranes is one in which the anion layer is formed from a solution of a copolymer of styrene and vinylbenzyl chloride with a multifunctional amine containing tertiary amine groups. Upon evaporation of the solvent from this system a crosslinked sheet of anion membrane is obtained. When this type of membrane is coated with a highly crosslinked cation resin in a matrix of the same or similar copolymer a bipolar membrane with a potential drop of 1.3V or less at 100 amp/ft$^2$ results. The modification by sanding and adding an additional coating of dry resin before the cation layer is added did not affect the potential drop of this type of membrane if the cation coating contained highly crosslinked resin particles.

In order to improve the permselectivity of the bipolar membranes, it is possible to coat additional layers of membrane forming materials onto the bipolar membrane. Thus the permselectivity of a membrane of the type just described may be improved by placing an additional coating on the cation side of cation resin in a polyvinylidene fluoride matrix or a linear partially sulfonated polystyrene. Partially sulfonated polysulfones or polyether-sulfones may also be used as an additional coating. Since this coating is not in contact with the anion layer, it is not necessary to use crosslinked polyelectrolytes. Similarly the anion side of the membrane may be made in layers so that the properties of the interface layer are different from those of the outside layer.

In both of the types of membranes just described the amine used in the anion layer plays a role in determining the potential drop of the resulting bipolar membrane. The table below shows the potential drop for several bipolar membranes of the type employing polyvinylidene fluoride in which the amine used for the anion layer was varied, but other variables were kept constant.

TABLE I

| Amine | Potential drop at 100 amp/ft$^2$ |
| --- | --- |
| N,N-dimethyl-1,3-propanediamine | 1.33 volts |
| N,N,N',N'-tetramethyl-1,3-propanediamine (TMPDA) | 1.59 volts |
| TMPDA + n-propylamine (5:1) | 1.41 volts |
| N-methylpiperazine + TMPDA (1:1) | 1.39 volts |

It will be apparent that variations may be made in the described systems without departing from the invention described to give bipolar membranes with useful properties. As an illustration, the anion layer of the membrane does not necessarily have to contain the quaternary ammonium groups before it is coated with the cation layer but can be converted after formulation of the layered structure. For example, a copolymer of styrene and vinylbenzyl chloride might be formed into a crosslinked sheet by employing less than a unit molar ratio of multifunctional 1° or 2° amine in the casting mixture. The film thus formed would not contain the necessary number of quaternary ammonium groups to have a low resistance but these groups could be introduced following the addition of the cation layer by reacting the remaining benzyl chloride groups in the anion layer with trimethylamine.

While polymers or copolymers containing the benzyl chloride group are conveniently employed as a constituent of the anion layer other copolymers which exhibit similar reactivity may also be used, e.g. polymers or copolymers of vinylbenzyl bromide or acetate of polymers containing haloalkyl groups other than the benzyl halide; for example, copolymers of alkyl bromide or haloalkylated derivatives of polystyrene other than the benzyl derivatives. Also, in accordance with the invention, bipolar membranes may be formed in which polymeric amines have been used for the anion layer. Thus casting together a matrix polymer, a polymeric amine such as poly-4-vinylpyridine and a multifunctional alkyl halide such as 1,4-dibromobutane would lead to a crosslinked anion membrane containing quaternary ammonium groups which could subsequently be coated with a cation resin and matrix polymer to be converted to a bipolar membrane.

Furthermore, the cation layer may be formed first from a partially sulfonated polystyrene in solution with a polyfunctional alcohol. On evaporation of the solvent at elevated temperature crosslinking by Friedel-Crafts alkylation reaction could occur. This crosslinked cation membrane would then be coated with anion resin in a suitable matrix, e.g. polystyrene either with or without modification of the cation membrane surface before coating. While the mechanical strength of the membranes herein described is usually adequate for most purposes, it is also possible to add an inert reinforcing material such as polyethylene, polypropylene or polytetrafluoroethylene screens or glass mats to the membranes without much effect on their electrical and selectivity properties. In addition, short fibers of glass, polyethylene or polypropylene added to the casting mixture may result in an improvement of the mechanical properties of the membranes.

The following examples will further illustrate the invention.

EXAMPLE I

Microparticulate ion exchange resin was prepared by the following procedure.

In an indented 3 neck flask equipped with a mechanical stirrer, 200 ml of $H_2O$ was heated to boiling (to expel $O_2$) then cooled under $N_2$ to below room temperature. 0.5 g $K_2S_2O_8$ and 3.0 g of sodium lauryl sulfate were added followed by 35 g of styrene and 20 g of 55% divinyl benzene. 0.5 g of $Na_2S_2O_5$ was added and the polymerization mixture was heated to about 40° then allowed to cool slowly to room temperature. After a polymerization time of about 16 hours the latex was coagulated by pouring into 2 liters of 10% NaCl solution. The precipitate was filtered, washed 2 times with 1500 ml portions of $H_2O$ then 2 times with one liter portions of methanol then dried at 60° to yield 47 g of polymer.

10 g of the dry polymer was dispersed in 100 ml of dichloroethane (DCE) in the blender. This was added slowly with good agitation to 40 ml of chlorosulfuric acid in 60 ml of DCE in a 3 neck flask and allowed to react for 1 hr at room temperature. The reddish reaction mixture was poured into 1 liter of ice/$H_2O$, filtered and washed with 500 ml of $H_2O$. The precipitate was suspended in 800 ml of $H_2O$ and boiled in an open beaker until the DCE was removed. The polymer dispersion was filtered, redispersed in 1 liter of $H_2O$ and collected on the filter again.

The resin was dried at 50° under vacuum. A resin may be converted from the $H^+$ form to the $Na^+$ form by slurrying in $H_2O$ and titrating with NaOH solution to pH 8 then collecting the resin by filtration.

EXAMPLE II 3.00 g of a 20% solution of polyvinylidene fluoride in N,N-dimethylformamide (DMF) was mixed with 1.37 g of a 10% solution of polyvinylbenzyl chloride in DMF. 1.8 ml of 1M N,N-dimethyl-1,3-propanediamine in dimethyl sulfoxide was added to the mixture, stirred well and cast on a glass plate by means of a doctor blade set to 0.025 in. After standing for 5 min. at room temperature the plate and clear gel were placed in a forced draft oven at 100°. Air circulation was stopped for 1 min. to allow the gel to set then turned on again. After a total of 10 min. in the oven the film and plate were removed from the oven and the surface of the film was lightly abraded with 500 grit sandpaper. About 0.1 g of a powdery cation resin in the Na+ form which had previously been prepared as in Example I except that 40 g of vinylbenzyl chloride and 10 g of commercial divinylbenzene were used in place of the 35 g of styrene and 20 g of divinylbenzene, was place on the abraded surface and spread by further light sanding. Excess resin was blown from the surface and the film and plate were returned to the oven at 100°. After 1 min. the film was coated by brushing on a mixture of 2.00 g 20% polyvinylidene fluoride in DMF, 1.00 g of DMF, and 1.36 g of a 10% dispersion of resin in DMF prepared as in Example I in the H+ form. After 5 min., the sheet was removed from the oven and soaked free of the glass plate in water. The membrane thus formed had a potential drop of 1.32 volts at 100 amp/ft$^2$ when measured in 0.5M Na$_2$SO$_4$.

EXAMPLE III 3.00 g of a 15% solution of vinylbenzyl chloride-styrene copolymer of 23 wt.% vinylbenzyl chloride in DMF was mixed with 0.23 g of N,N,N',N'-tetramethyl-1,6-hexanediamine. The solution was allowed to stand for 2 min. at room temperature then spread on a glass plate to a thickness of 0.025 in. by means of a doctor blade. After standing for 5 min. at room temperature the plate was placed in the oven at 100° for 10 min. The film thus formed was coated by brushing on a mixture made by mixing 2.00 g of a 10% dispersion of microparticle resin in the H+ form prepared according to Example I in DMF mixed with 1.32 g of a 15% solution of the above vinylbenzyl chloride-styrene copolymer in DMF. The coated film was heated for 4 min. at 100°, then recoated by brushing on a mixture made by mixing 1.00 g of the above microparticle resin dispersion with 1.43 g of a 20% solution of polyvinylidene fluoride in DMF. The membrane was removed from the oven after 5 min. additional heating and soaked free of the glass plate in water. The potential drop across the bipolar membrane was 1.24 volts at 100 amp/ft$^2$ when measured in 0.5M Na$_2$SO$_4$ solution.

EXAMPLE IV

Figure 2:
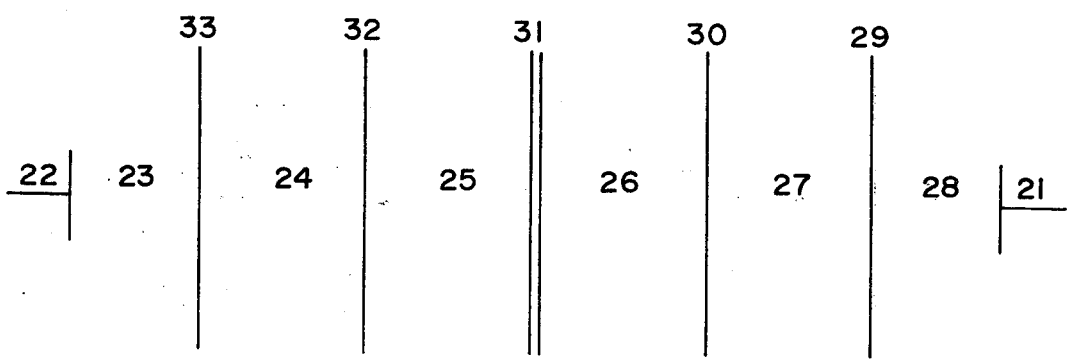
FIG. 2 illustrates schematically a multi-compartment unit in which membrane of the invention may be tested.

The water splitting efficiency of the bipolar membrane of Example II was measured in a cell in which the membranes of 11 cm$^2$ effective area were arranged as shown in FIG. 2. As shown the bipolar membrane is centrally positioned between a cathode 21 and anode 22 and a plurality of membranes 29, 30, 32 and 33 defining a series of compartments 24, 25, 26 and 27. The membranes, 29, 32 and 33 are cationic membranes and 30 is anionic membrane. Solutions were circulated from reservoirs to the cell and returned to the same reservoirs from which they came during the course of the experiment. The electrolyte solution was 1 l of 0.5M Na$_2$SO$_4$ and was circulated through the anolyte and cathoylte compartments 23 and 28, respectively. The salt solution was 1 l of 1M NaCl and was circulated through salt compartments 24 and 27. Initially the base was 141.9 ml of 0.7005N NaOH and was circulated through compartment 25. Initially the acid was 102.5 ml of 0.2M Na$_2$SO$_4$ and 0.724 M NaHSO$_4$ and was circulated through compartment 26. A direct current of 1.2 amp. was passed through the cell for a period of 4000 sec. which caused the volume of the base to increase to 145.2 ml of the concentration to increase to 1.002N NaOH and which caused the volume of the acid to increase to 105.0 ml and the normality to increase to 1.085N. Thus, the current efficiency for base production was 93% and for acid production 80%. The actual bipolar membrane water splitting efficiency is greater than either of these efficiencies since these reflect not only bipolar inefficiency but also inefficiency in the monopolar membranes. By similar technique the membrane of Example 3 gave 88% base efficiency and 78% acid efficiency.

It will be apparent that various changes may be made by those skilled in the art in the methods described for producing bipolar membranes by the method of this invention.

We claim:

1. A method for preparing bipolar membranes which comprises:
    coating on (a) an ion exchange membrane, a fluid mixture of a dispersion of (b) particles of an ion exchange resin in (c) a matrix polymer where (b) has a charge opposite to the charge of (a); and
    bonding said membrane and mixture to form a unitary bipolar membrane structure.

2. The method of claim 1 wherein said mixture (b) and (c) of ion exchange resin and matrix polymer is coated on membrane (a) as a slurry of the resin (b) in a solution of the matrix polymer and wherein the bonding thereof is effected by evaporation of the solvent from the slurry.

3. The method of claim 1 wherein the mixture of (b) ion exchange resin and (c) matrix polymer is coated and bonded as a melt on said membrane (a).

4. The method of claim 1 wherein (b) the ion exchange resin bonded to the membrane (a) has a particle size of less than one micron.

5. A method for preparing bipolar membranes which comprises coating on a membrane which is comprised of an inert polymeric matrix and an anion exchange crosslinked polyelectrolyte, a dispersion of cation exchange resin particles having a particle size of less than one micron diameter in a solution of a matrix polymer, and evaporating the solvent from the cation exchange resin solution to form a unitary bipolar membrane structure.

6. The method of claim 5 in which the polymeric matrix employed with the anion polyelectrolyte and the matrix polymer employed with the cation exchange resin are the same.

7. The method of claim 5 in which the cation exchange resin is crosslinked to at least an equivalent amount as obtained by crosslinking with at least 10% divinylbenzene.

8. The method of claim 5 in which the surface of the anion membrane is coated with a layer of dry crosslinked cation exchange resin before the cation exchange resin dispersion is applied.

9. The method of claim 5 in which the inert matrix is polyvinylidene fluoride.

10. A method for preparing bipolar membranes which comprises mixing a solution of polyvinylidene fluoride with a solution of polyvinylbenzyl chloride, generating quaternary ammonium groups by introducing into said mixture a multifunctional amine, casting the mixture as a film and evaporating the solvent to give an anion membrane, abrading the surface of said membrane, coating said abraded membrane with a dry cation exchange resin, and then with a suspension of cation exchange resin in a solution of polyvinylidene fluoride and evaporating the solvent to provide a unitary bipolar membrane structure.

11. A method for preparing bipolar membranes which comprises casting a solution of a copolymer which forms quaternary ammonium groups when reacted with a multifunctional amine and an amine or mixture of amines which is capable of forming quaternary ammonium groups by reaction with said copolymer, evaporating the solvent to give an anionic membrane, depositing on said membrane a dispersion of cation exchange resin in a solution of a matrix polymer and evaporating the solvent from the cationic resin solution to provide a unitary bipolar membrane structure.

12. The method of claim 11 in which one of the monomers of the copolymer is vinylbenzyl chloride.

13. The method of claim 11 in which the copolymer is comprised of styrene and vinylbenzyl chloride units.

14. The method of claim 11 in which said anionic membrane is abraded and coated with a dry cation exchange resin having a particle size of less than one micron before depositing said cation exchange resin in a solution of matrix polymer.

15. The product produced by the method of claim 1.

16. The product produced by the method of claim 10.

17. The product produced by the method of claim 11.